United States Patent Office 3,516,535
Patented June 23, 1970

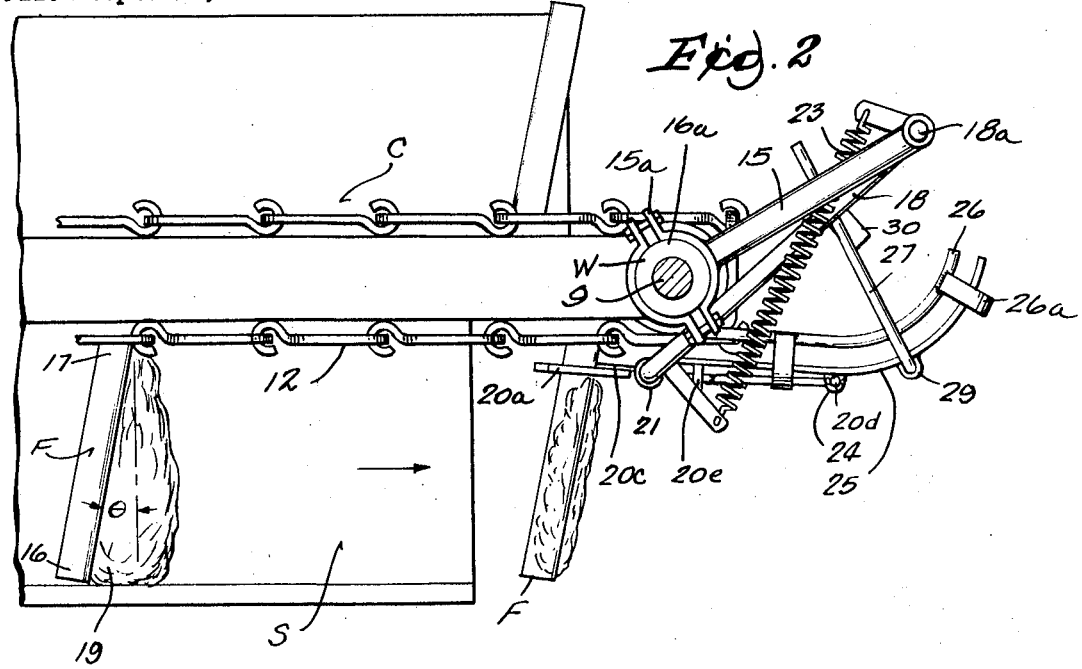
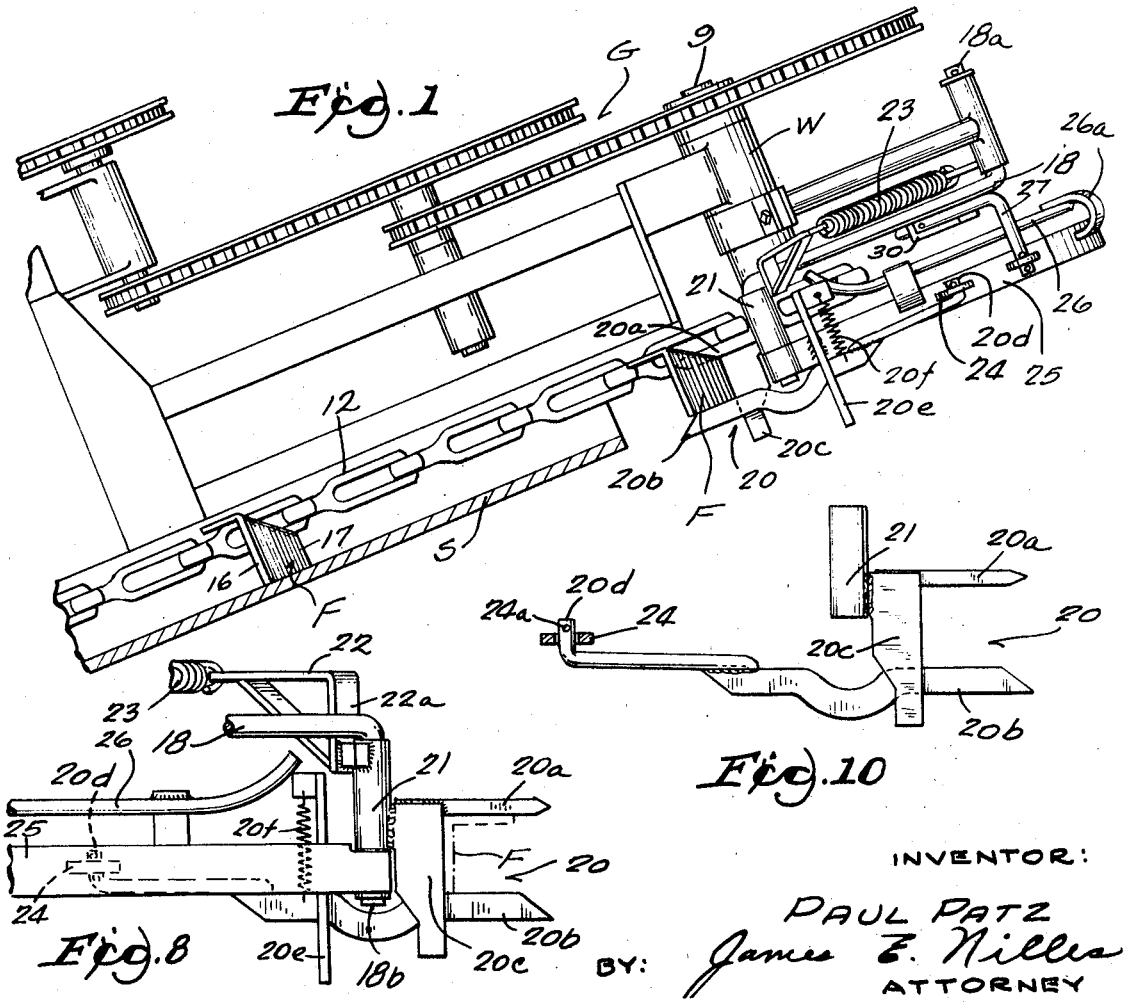

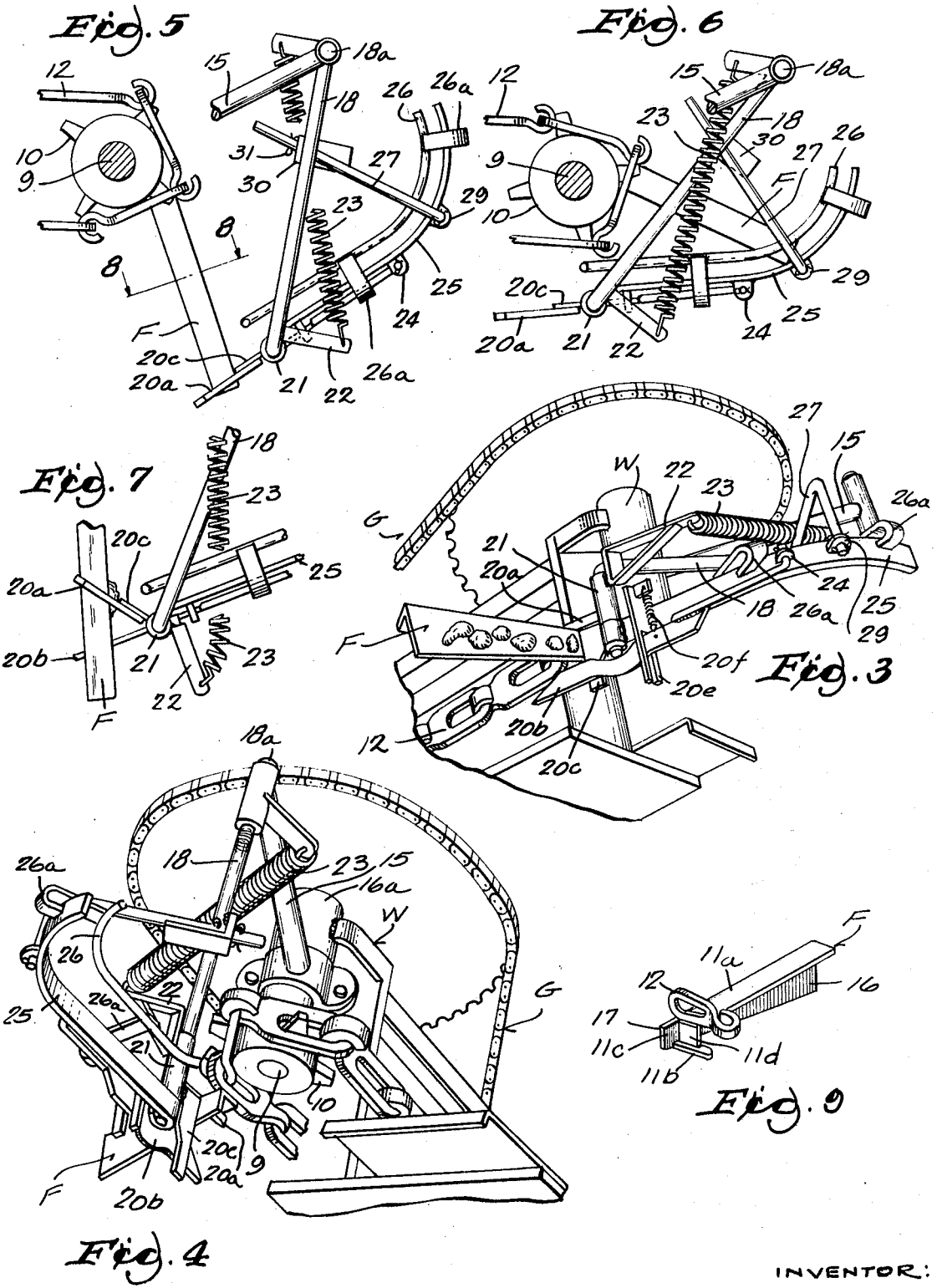

3,516,535
FLIGHT CLEANER FOR MATERIAL MOVING MECHANISM
Paul Patz, Pound, Wis., assignor to Patz Company, Pound, Wis., a partnership
Filed Sept. 16, 1968, Ser. No. 759,944
Int. Cl. B65g 45/00
U.S. Cl. 198—229                              9 Claims

ABSTRACT OF THE DISCLOSURE

A device for cleaning the flights of material moving mechanism such as for example, a barn cleaner. Barn cleaners of the type to which this invention relates have an endless chain and a series of spaced flights each secured at one end along the length of the chain and extending outwardly from the chain to terminate in a free end.

More specifically, the present invention relates to an improved mechanism for positively cleaning the flights, even though the flights are of nonuniform height.

BACKGROUND OF THE INVENTION

The present invention relates generally to mechanism for moving material such as barn cleaners of the type having an endless chain and a series of spaced flights each secured at one end along the length of the chain and extending outwardly from the chain to terminate in a free end. The chain is trained around suitable guides and wheels located in the various gutters in the barn and then passes a discharge area. The flights are dragged by the chain through the gutters to thereby push the manure along the gutter and eventually to the discharge area.

The discharge portion of the cleaner usually consists of an elevated ramp up which the manure is pushed and from the upper end of which it may fall onto a manure spreader. As the manure falls from the ramp, the chain turns around the end sprocket at the discharge end of the ramp and in doing so the flights conventionally swing rapidly around to reverse their direction of travel. The flight cleaners are swingable along the length of the flights, and as these flight cleaners are usually of considerable size and mass and are also spring loaded, after the cleaning operation they swing with considerable velocity, momentum, and a violent slapping action, all of which is detrimental to the life of the component parts of the cleaner.

The manure and other material moved by the flights is very heavy, cohesive, and tends to adhere rather firmly to the flights. If this material is not continually scraped from the flights, it will eventually build up to such an extent as to cause malfunctioning and non-functioning of the entire barn cleaning equipment. Furthermore, if the material is not wiped clean from the flights at the discharge end of the cleaner, it will be returned to the troughs to furthermore aggravate the manure removal problem.

The present invention is in the nature of an improvement over the flight cleaner shown in U.S. Pat. No. 3,013,651, issued Dec. 9, 1961, and the present invention can accommodate flights of the type shown in the copending U.S. application Ser. No. 672,168 filed Oct. 2, 1967, now Pat. No. 3,447,667.

SUMMARY OF THE INVENTION

The present invention provides an improved flight cleaning mechanism for a barn cleaner or the like, the construction and operation of the flight cleaner being such that the scraper forcefully penetrates the mass of material as the flight is commencing to be cleaned, and wipes clean the top, bottom and front side of the flight, even though the flight is of tapered height throughout its length. This forceful and positive initial penetration insures that the scraper will come into contact with the flight early in the scraping procedure and at a point on the flight which is closely adjacent to its point of attachment to the endless chain. This action is such that complete scraping action occurs across the entire length of the flight.

These and other objects of the invention will appear hereinafter as this disclosure progresses, reference being had to the accompanying drawings in which:

BRIEF DESCRIPTION OF THE DRAWINGS

FIG. 1 is a fragmentary side elevational view of an improved barn cleaner made in accordance with the present invention, certain parts being shown as broken away or removed for clarity;

FIG. 2 is a plan view of the device shown in FIG. 1;

FIG. 3 is a perspective view of a fragment of the barn cleaner shown in FIG. 1, the view being taken generally from beneath the discharge end and showing the device at the start of a cleaning stroke;

FIG. 4 is a view similar to FIG. 3, but taken from the opposite side of the discharge end and showing the scraper when it has moved to a position intermediate the length of the flight being cleaned;

FIG. 5 is a fragmentary plan view similar to FIG. 2, but showing the scraper when it has reached the end of the flight being cleaned;

FIG. 6 is a view similar to FIG. 5, but showing the flight when it has travelled past a portion of the arcuate guide and when the latter has partially returned to its original position;

FIG. 7 is a view generally similar to FIG. 5, but showing the upper portion of the scraper bent to the release position as when encountering material which has been frozen to the flight being cleaned;

FIG. 8 is a fragmentary elevational view taken generally along line 8—8 in FIG. 5;

FIG. 9 is a perspective view of a tapering height flight which is cleaned by the present invention; and FIG. 10 is a view similar to FIG. 8 but illustrating the two piece scraper by itself.

DESCRIPTION OF A PREFERRED EMBODIMENT

Referring in greater detail to the drawings, an inclined discharge ramp or slide S is usually positioned outside of the barn and an endless chain conveyor C moves first upwardly in the slide, and when reaching the end of the slide it causes the material to be pushed from the upper or discharge end of the slide. As the material is discharged and falls by gravity into a waiting manure spreader or the like, the conveyor turns about 180 degrees and then moves downwardly along the opposite side of the slide and back into the area to be cleaned, in the well-known manner.

The drive for the endless chain type conveyor is furnished by an electric motor (not shown) mounted adjacent the discharge end of the slide. The motor through suitable reduction gearing G in the form of sprocket wheels and chains drives the shaft 9 which is rotatably mounted in the framework W at the discharge end of the slide. A sprocket 10 is fixed to the lower end of the drive shaft 9 and over which the flexible endless chain 12 of the conveyor passes.

The cleaning flights F shown for the purposes of illustration are comprised of hevay angle iron sections, the inner ends of which are rigidly secured as by welding to certain links of the endless chain. The flights extend away from the chain in a generally rearward and outward relationship thereto and the tautness of the chain holds them generally in this position as they travel through the various troughs and discharge slide. The other end of the flights terminate in a free end which pass closely adjacent to the gutter wall for thorough cleaning thereof.

As these flights swing around the drive sprocket 10 at the upper end of the discharge slide, their free ends swing rapidly and forcefully in making this 180-degree turn. These flights are of considerable weight and size and consequently this swinging action is quite violent.

The heavy and cohesive nature of the material moved by the flights tends to cause it to adhere to anything it comes in contact with. Serious problems have heretofore arisen in devices of this character due to the difficulty encountered in properly and completely cleaning the flights at the discharge end of the barn cleaner. If not removed, this sticky mass builds up on the flights and becomes hardened to such an extent that it is difficult to remove.

The conveyor includes a series of flights F which are welded at their inner end to a link of the chain 12 and which extend across the gutter for moving material along in the gutter. As the conveyor C leaves the barn, it travels upwardly to the end of the ramp or slide S where it discharges the material conveyed thereby. The flights F then return downwardly back into the barn for another trip through the barn gutter.

As shown clearly in FIG. 9, the chain links themselves are welded to the top, horizontal flange 11a of the flight. A foot 11b is welded at the bottom edge of the rear, vertical flange 11c of the flight, and a gusset 11d is welded between the foot and flanges for rigidity. The foot slides along the gutter bottom and thus supports the inner portion of the conveyor and prevents the flight from tipping.

The material often found in environments of this nature include a semiliquid manure which is frequently difficult if not impossible to handle in an efficient manner. Prior art devices have certain shortcomings, such as for example, the inability to load the fluid material evenly and convey it along the gutter and up the ramp without excessive spilling. Heretofore it has been difficult if not impossible to load the flight evenly across its length and further more difficult to contain the semifluid or fluid material.

The flights F are substantially coextensive in length wtih the width of the gutter so as to occupy the entire width thereof. A rearward angle θ of approximately 14 degrees (FIG. 1), in respect to the normal line of flight travel where the flight is welded to the chain, is particularly efficient for providing a good cleaning and sweeping action of the flight, while at the same time insuring that the flight loads evenly across its length. In addition, by making the height of the outer end 16 of the flight of a greater dimension than the inner end 17 of the flight, that is where it is attached to the chain, a pocket is formed between the outer end of the fight and the side wall and bottom of the gutter. It is in this pocket that the semiliquid type manure, more particularly the fluid portion thereof, tends to collect.

It is particularly efficient to provide the varying height of the flight as follows. For a flight of approximately 18 inches in length, if the inner end where it is attached to the chain is made approximately 2 inches in height, while the outer end 16 of the flight is made approximately 4 inches in height, good loading and uniform conveying is provided. In other words, with such a dimensioning of parts, the liquid material is trapped and efficiently conveyed without spilling over and this is especially true when the conveyor is moving up the incline ramp. With this conveyor flight as described, by the time sufficient liquid material is captured so as to be flowing over the lower end of the flight, the outer or higher end of the flight is also filled to capacity.

The tapering height of the flight should preferably be gradual across its length and the above dimensioning of parts is particularly satisfactory regardless of the length of the flight. In other words, if a length of flight shorter than 18 inches were used, the outermost end of that flight would be lower than 4 inches. Conversely, if a longer flight than 18 inches is used, the outer end of the flight would be greater than 4 inches.

The present invention to be described can completely clean a flight of the above type.

The invention provides an improved means for insuring that each flight is completely scraped free of material as it swings over the discharge location, regardless of the nonuniform flight height. The scraping means provided by the present invention acts with a considerable initial thrust to forcefully penetrate the material and thereby come into early and complete contact with the flight. This initial contact is made at a location closely adjacent to the point where the flight is attached to the endless chain, thereby insuring that the scraper commences cleaning action at the proper time.

The improved scraper mechanism is mounted to the frame W by the bracket 15 which is clamped by its yoke 15a to the upstanding tubular member 16a of the frame W. A scraper arm 18 is swingably mounted by its upturned portion 18a about a generally vertical axis at the outer end of the bracket. The scraper arm could otherwise be secured directly to the main frame of the barn cleaner in any suitable manner, other than by the use of a special bracket. At any rate, the scraper arm is swingably mounted in respect to the barn cleaner in general.

SCRAPER

The fork-shaped scraper 20 embraces the forward side of the flight and as the continually moving flight moves in an arcuate path the scraper is forcibly moved over the length of the flight to wipe the material thoroughly therefrom. A portion of the scraper is pivotally mounted by its tubular portion 21 on a downwardly extending end 18b of the scraper arm 18. A lever 22 is secured by welding to the tubular portion 21. A heavy tension spring 23 acts between the lever 22 of the arm 18 and the bracket 15.

The scraper 20 includes an upper prong 20a which is formed integral with the vertical portion 20c. Prong 20a serves to forcefully wipe the upper edge of the flight, and vertical portion 20c scrapes the front side of the flight flange 11c. The scraper also includes a lower prong 20b for wiping the lower edge of the flight, and this lower prong can swing vertically (as indicated by the arrow in FIG. 10), that is, relative to the upper prong 20a and the vertical portion 20c. More specifically, the lower prong 20b is formed as a long arm which is pivoted at one end about its vertical axis 20d in a bracket 24, being held there by a cotter key 24a. The connection between axis 20c and the hole in bracket 24 is loose enough to also permit vertical swinging of the prong. A slotted guide member 20e is secured to guide 25 and the prong 20b slides vertically in this slotted guide.

The front or free end of the swinging prong 20b is formed as a vertically disposed flat portion which can slide against the vertical scraper portion 20c. It will be noted (FIG 10) that the scraper portion 20c extends downwardly a sufficient distance below the vertically swingable prong 20b so as to always be in contact therewith, regardless of the swinging movement of the lower prong 20b. A spring 20f acting between the prong 20b and guide 25 resiliently urges the prong 20b upwardly and tightly against the lower edge of the flight F.

By providing a two-piece scraper as above described, the tapered flight can be wiped clean along its entire length and along its entire upper and lower edges.

GUIDE

Also pivotally mounted on the downwardly extending portion of the scraper arm is an arcuate guide 25 which curves generally in the direction in which the outer end of the flight rotates as it is swung around the end sprocket. The guide includes an upper support rod 26 rigidly fixed to guide 25 by braces 26a, and this rod prevents undue upper movement of the outer end of the flight as the flight swings against the guide. A rod 27 is pivotally mounted by its downwardly extending end in the bracket 29 secured to the outer side of the guide. The free end of this rod is mounted in another bracket 30 which is welded to the scraper arm 18. Cotter keys 31 extend through the rod 27 one on each side of bracket 30, and lock the guide in any one of a number of adjusted positions relative to the scraper arm.

Thus the guide 25 is adjustably fixed in relation to the scraper arm for swinging as a unit therewith. The adjustment is for the purpose of accommodating flights of different length. The scraper portions 20a and 20c are pivoted on the scraper arm 18 and can swing relative to the arm and guide when a force over a predetermined maximum is encountered, as will later appear. Normally, however, the scraper 20 and guide 25 swing together as a unit and are biased inwardly toward the endless chain by the action of the heavy spring 23.

GENERAL

The mounting and position of the spring 23 relative to the swinging scraper and guide is such that it initially acts with considerable leverage to tightly hold the scraper close to the chain and normal to the oncoming flight. It is at this time that considerable holding force by the spring is required. However, as the flight moves and forces the scraper outwardly toward the end of the flight, the effective leverage of the spring is decreased. The result is to provide great penetration pressure for the scraper initially, and then as the scraper approaches the end of the flight and assumes a lesser angular relationship thereto, the spring pressure of the scraper on the flight decreases. This has the desirable effect of reducing the twisting leverage of the flight on its conveying chain and reduces the horsepower requirement which would otherwise be necessary to pull the flight against the resistance of the scraper; it is also has the desirable effect of returning the scraper to its original position with less violence, as will appear.

As the flight F approaches the cleaning mechanism, the scraper fork 20 is positioned normally at a right angle to the flight F and is located closely adjacent to the endless chain 12. The spring 23 holds the fork tightly in this inward position, and the scraper 20 acts with a high penetration force to positively penetrate the material being moved ahead of the flight. It is important that the scraper 20 contact the flight F at the extreme inner end 17 of the flight so that when the scraping action commences the entire flight will be wiped clean.

FIG. 5 shows the position of the scraper 20 when it has reached the outer end of the flight being cleaned, and just prior to the end of the flight commencing its contact with the arcuate guide 26. At this time, the material has been thoroughly wiped from the flight F in a radially outward direction causing the material to be thrown or pushed from the end of the flight. During the entire wiping action the spring 23 has acted to forcefully hold the scraper 20 in embracing position over the forward side of the flight.

Immediately after the flight has left the forked scraper 20, the outer end 16 of the flight F commences its contact with the guide 25; in other words, the movement of the flight past the scraper and onto the guide is a smooth and continuous movement.

FIG. 6 shows the position of the flight when it has travelled approximately half-way past the guide 25 and during which time it acts to hold the guide 25 and the scraper 20 from uncontrollably swinging under influence of the spring 23 and back to its initial position. In other words, the outer end 16 of the cleaned flight slidingly bears against the arcuate guide 25 as it makes its 180-degree turn, and serves to ease the cleaning mechanism back into its initial position.

The guide 25 also reacts on the flight to cause the flight cleaner to return gently thereby eliminating the previously mentioned slapping action and furthermore the support rod 26 of the guide acts to prevent upward swinging of the flight, which is otherwise uncontrolled because the bottom of the slide does not extend around the outer end of the ramp.

The resulting operation insures that the scraper positively penetrates the material and wipes the entire flight clean. The guide permits the cleaning unit to swing gently to its initial position without shock loads or slapping action on any of the structure. The guided flight swings smoothly during the cleaning operation and around the sprocket.

As shown in FIG. 7, in the event a bent or otherwise damaged flight is encountered by the scraper, scraper portions 20a and 20c pivot together inwardly and relative to the scraper arm 18 and guide 25, and against the action of the spring 23. In normal operation, however the entire scraper is aligned with the initial or straight portion of the guide 25, and is prevented from outward swinging relative thereto because downwardly extending portion 22a of the lever 22 contacts the scraper arm 18 as shown best in FIG. 8 and is held tightly thereagainst by the action of the spring. Normally the scraper arm, guide and scraper swing together as a unit as they move along the flight being cleaned.

The present invention provides a highly efficient flight cleaning mechanism which operates smoothly and contributes materially to the increased life of the entire unit.

I claim:

1. Material moving mechanism having a continuously moving endless conveyor chain and a series of flights each secured at one of their ends to said chain and having a free end extending therefrom, said flights having a front being of varying height along their length and having an upper and lower edge, and means for swinging said flights in an arcuate path over a discharge area, a flight cleaner mounted on said mechanism adjacent said area and comprising, a flight scraper swingably mounted for swinging from a starting position where it initially contacts a flight adjacent to said one end thereof and then in scraping contact with said flight and past the free end thereof, said scraper being formed of two portions movable relative to one another and in scraping contact with upper and lower edges of said flight.

2. A device as defined in claim 1 further characterized in that said scraper includes a main portion and a prong swingably mounted relative to said main portion.

3. A device as defined in claim 2 including a resilient means for biasing said prong against one edge of said flight.

4. A flight cleaner for use with material moving mechanism of the type having a continuously moving endless conveyor chain with a series of flights each secured at one of their ends to said chain and having a free end extending therefrom, said flights having a front being of varying height along their length and having an upper and lower edge, and means for swinging said flights in an arcuate path over a discharge area, said flight cleaner being adapted to be mounted on said mechanism and adjacent said area, said flight cleaner comprising, a flight scraper swingably mounted for swinging from a starting position where it initially contacts a flight adjacent to said one end thereof and then in scraping contact with said flight and past the free end thereof, said scraper being formed of two portions movable relative to one another and in scraping contact with upper and lower edges of said flight.

5. A device as defined in claim 4 further characterized in that said scraper includes a main portion and a prong swingably mounted relative to said main portion.

6. A device as defined in claim 5 including a resilient means for biasing said prong against one edge of said flights.

7. A flight cleaner for material moving mechanism having flights with upper and lower edges that define a flight of varying height, said cleaner comprising, a bracket having means for rigid attachment to said mechanism, a flight scraper swingably mounted on said bracket, said scraper being formed of two portions movable relative to one another and in scraping contact with upper and lower edges of said flight, a resilient means connected to said scraper for urging the latter in one direction, and guide means connected with said scraper for swinging therewith.

8. A device as defined in claim 7 further characterized in that said scraper includes a main portion and a prong swingably mounted relative to said main portion.

9. A device as defined in claim 8 including a resilient means for biasing said prong against one edge of said flights.

References Cited

UNITED STATES PATENTS

| | | | |
|---|---|---|---|
| 2,768,734 | 10/1956 | Klinzing | 198—229 |
| 3,013,651 | 12/1961 | Patz et al. | 198—229 |

HUGO O. SCHULZ, Primary Examiner